United States Patent

Tsuruta et al.

Patent Number: 5,554,839
Date of Patent: Sep. 10, 1996

[54] CERAMIC HEATER

[75] Inventors: Tadashi Tsuruta, Chita; Masatoshi Suzuki; Hiromi Sano, both of Nagoya; Namitsugu Fujii, Yokkaichi; Hiroshi Sugino, Chita-gun, all of Japan

[73] Assignee: Nippondenso Co., Ltd., Kariya, Japan

[21] Appl. No.: 208,786

[22] Filed: Mar. 11, 1994

[30] Foreign Application Priority Data

Mar. 12, 1993 [JP] Japan .................................. 5-052502
Feb. 28, 1994 [JP] Japan .................................. 6-030173

[51] Int. Cl.⁶ .................................................. H05B 3/44
[52] U.S. Cl. ......................................... 219/544; 219/553
[58] Field of Search ............................... 219/457, 458, 219/459, 544, 542, 553, 534

[56] References Cited

U.S. PATENT DOCUMENTS 4,523,935  6/1985  Takagi et al. .......................... 219/544
4,613,455  9/1986  Suzuki et al. .......................... 219/553

FOREIGN PATENT DOCUMENTS

| 57-186161 | 11/1982 | Japan . |
| 58-142778 | 8/1983 | Japan . |
| 58-142779 | 8/1983 | Japan . |
| 58-142780 | 8/1983 | Japan . |
| 59-152586 | 10/1984 | Japan . |
| 1231285 | 9/1989 | Japan . |
| 2-75188 | 3/1990 | Japan . |
| 3183942 | 8/1991 | Japan . |
| 4249089 | 9/1992 | Japan . |

*Primary Examiner*—Teresa J. Walberg
*Assistant Examiner*—Sam Paik
*Attorney, Agent, or Firm*—Cushman, Darby & Cushman

[57] ABSTRACT

A ceramic heater which can be produced easily, induces no increase of production cost and can restrict the resistance change of a heating body due to migration. According to the present invention, a gap is formed between a ceramic sintered body and a heating body. Thus, migration in which cations are seized within the gap is caused so as to impede the cations from entering into the heating body. This makes it difficult for the cations to migrate and the volume in which the heating body is expanded is secured by the gap 13.

9 Claims, 9 Drawing Sheets

CERAMIC HEATER

BACKGROUND OF THE INVENTION

1. Field of the Invention

The present invention relates to a ceramic heater which is used in an oxygen sensor and the like.

2. Description of the Related Art

Conventionally, in order to purify exhaust gas from vehicles or the like, oxygen sensors have been used to measure the concentration of oxygen in exhaust gas and adjust the ratio between air and fuel. Some kinds of oxygen sensors utilize an oxide semiconductor made of $TiO_2$ the resistance of which changes depending on differences of, for example, oxygen concentration as the detecting device thereof, and other kinds of oxygen sensors utilize a solid electrolyte made of $ZrO_2$ which generates electromotive force depending on differences of oxygen concentration as the detecting device. Because these sensors operate at high temperatures, it is necessary to raise the temperature of the detecting device. A ceramic heater including a metallic heating element made of Pt which is embedded in a ceramic sintered body such as $Al_2O_3$ is used as a heating means. To use the sensors stably, it is necessary to restrict changes of the resistance of the heating element in the ceramic heater.

However, in ceramic heaters, cations such as $Ca^{2+}$ or $Mg^{2+}$ from CaO and MgO which are sintering assistants contained in the ceramic sintering body are transferred from the +electrode of the heating body to the −electrode thereof under high temperatures and high electric potential differences during use, and then deposited on the single electrode (migration). Due to the migration, the cations react with the heating body metal or the condition of the heating body changes, so that the resistance of the heating body increases thereby sometimes breaking wires or expanding the volume of the heating body to cause cracks in the ceramic sintered body. Consequently, the durability of the ceramic heater is deteriorated. For this reason, the changes of the resistance of the heating body due to migration are a significant problem concerning the stable use of sensors.

Japanese Patent Publication No. 3-183942 has disclosed a ceramic heater in which the heating body is formed in a parallel pattern. The intention concerned with the ceramic heater thereof is to decrease an electric potential difference applied inbetween the patterns thereby preventing migration by forming the heating body in the parallel pattern.

Japanese Patent Publication No. 4-249089 has disclosed a ceramic heater which utilize a ceramic sintered body of 98% or more by weight of alumina and 2% or less by weight of a sintering assistant. The purpose of the ceramic sheet of this invention is to decrease the absolute quantity of cations such as $Ca^{2+}$ under high temperatures and high electric potential difference in order to prevent migration.

However, if it is intended to form the heating body of the parallel pattern as described above, the design process of such a pattern for obtaining excellent soaking characteristics becomes complicated and further, disparity of production quality increases as compared with conventional series patterns, making it very difficult to produce the heating body.

If the sintering assistant employs a ceramic sintered body of 2% by weight or less, it becomes difficult to sinter the ceramic sintered body, so that it becomes necessary to pulverize the ceramic powder and increase the sintering temperature thereby leading to increased production costs.

Although it is possible to devise a method for decreasing the electric potential difference applied to the heating body by reducing the resistance of the heating body by increasing the film thickness of the heating body, this method induces the increase of production costs when a precious metal such as Pt is used as the heating body.

SUMMARY OF THE INVENTION

In view of the aforementioned problem of the related art, an object of the present invention is to provide a ceramic heater which can be produced easily and to restrict changes of the resistance of a heating body due to migration without an increase in production costs.

According to the present invention, there is provided a ceramic heater comprising a ceramic sintered body and a metallic heating body embedded in and contacting the ceramic sintered body, there being a gap between part of the surface of the embedded heating body and the ceramic sintered body.

It is possible to form the gap on part of the surface of the heating body. In this case, the desirable ratio $(d_1/d_2)$ between the depth of the gap $(d_1)$ and the film thickness $(d_2)$ of the heating body is 0.2 or more, and particularly the ratio $d_1/d_2$ is desired to be 0.5 or more. However, if the ratio $d_1/d_2$ exceeds 4.0, the strength of the ceramic heater drops. Thus, it is necessary to take a measure such as enlarging the area in which the heating body is in contact with the ceramic sintered body.

Although the gap is effective if it is provided on at least the −electrode, it is difficult to form the gap on the −electrode alone from the viewpoints of production. Additionally, because it is troublesome to distinguish between the −electrode and the +electrode on the assembly line when the ceramic heater is mounted on a vehicle, it is desirable that the gap be provided between the ceramic sintered body and the heating body for both the −electrode and the +electrode.

The ceramic heater of the present invention can be produced according to the following production method. Namely, at least a pair of green sheets are prepared and metal-containing paste is screen-printed on one green sheet to form a heating body pattern. Then, the other green sheet is laid thereon and the laminate is sintered. If the amount of organic vehicle contained in the metal contained paste is changed, the amount of the contraction of the metal-containing paste is changed. Consequently, it is possible to form a deep gap depending on the amount of the contraction.

In the ceramic heater according to the present invention, the cations transferred by migration are collected by the gap to impede the cations from entering into the heating body. Further, the volume in which the heating body is expanded by migration is absorbed by the gap. As a result, in the ceramic heater according to the present invention, the increase of the resistance of the heating body is restricted and further, cracks of the ceramic sintered body due to the expansion of the heating body volume are prevented to improve the durability of the ceramic heater.

Still further, in the ceramic heater according to the present invention, it is not necessary to form a complicated heating body pattern which causes a great disparity of production quality, to reduce the amount of sintering assistant or to increase the film thickness of the heating body.

DETAILED DESCRIPTION OF THE PREFERRED EMBODIMENTS

Embodied examples of the present invention will be described with reference to the accompanying drawings.

EXAMPLE 1

A ceramic heater 1 which utilizes an oxide semiconductor made of $TiO_2$ as its detecting device is applied to an oxide sensor for detecting oxygen concentration in the fuel control apparatus in internal combustion engines of vehicles and the like.

Figure 1:
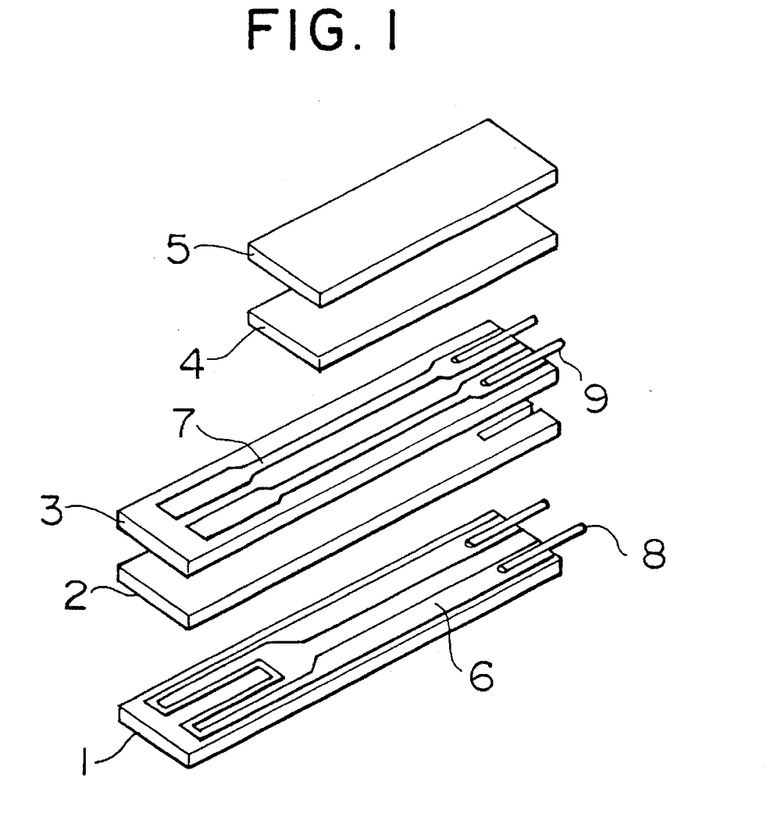
FIG. 1 is a disassembly perspective view of the ceramic heater of the example 1 before assembly.

First, mixed powder composed of 92% by weight of $Al_2O_3$ powder, 4% by weight of $SiO_2$, 2% by weight of CaO and 2% by weight of MgO are prepared, $SiO_2$, CaO and MgO being components. 12 weight part of butyral and 6 weight part of dibutylphthalate are added to 100 weight part of this mixed powder and mixed in organic solution to obtain a slurry. From the slurry, alumina green sheets 1–5 as shown in FIG. 1 are formed according to the doctor blade method.

Next, mixed powder composed of 82% by weight of Pt powder and 18% by weight of $Al_2O_3$ are prepared. An organic vehicle composed of 85% by weight of terpineol and 15% by weight of etyle cellulose are prepared. 50 weight part of organic vehicle is added to 100 weight part of the mixed powder to prepare Pt paste for the heating body. As shown in FIG. 1, a pattern is screen-printed on the alumina green sheet located at the bottommost position using the Pt paste to be used for the heating body to form the heating pattern 6.

Likewise, mixed powder composed of 90% by weight of Pt powder and 10% by weight of $Al_2O_3$ powder are prepared. Also, an organic vehicle composed of 90% by weight of terpineol and 10% by weight of etyle cellulose are prepared. 30 weight part of organic vehicle is added to 100 weight part of the mixed powder to prepare Pt paste for the electrode. Using the Pt paste for the electrode, a pattern is screen-printed on the alumina green sheet 3 located at the third position from the bottommost position to form an electrode pattern 7 for taking out sensor output.

A lead wire 8 made of Pt is placed at the end portion of a heating body pattern 6 in the aforementioned alumina green sheet 1, and the alumina green sheet 2 in which a cutout is provided for embedding the lead wire 8, is placed on the alumina green sheet 1. The aforementioned alumina green sheet 3 is mounted on the alumina green sheet 2. A lead wire 9 made of Pt is placed at the end portion of the electrode pattern 7 in the alumina green sheet 3 and then the alumina green sheet in which a cutout is provided for embedding the lead wire 9 is mounted on the alumina green sheet 3. Finally, the alumina green sheet 5 is mounted on the alumina green sheet 4.

The laminates are thermo-compression bonded together and sintered in an atmospheric environment of 1,500° C.–1,600° C. for about 2 hours. Consequently, the organic vehicle contained in the Pt paste to be used for the heating body is extinguished, so that the heating body pattern 6 is contracted toward the alumina green sheet 6 depending on the proportion of the organic vehicle in the Pt used the heating body. As a result, as shown in FIG. 2 and FIG. 3A, ceramic heater is obtained.

Figure 2:
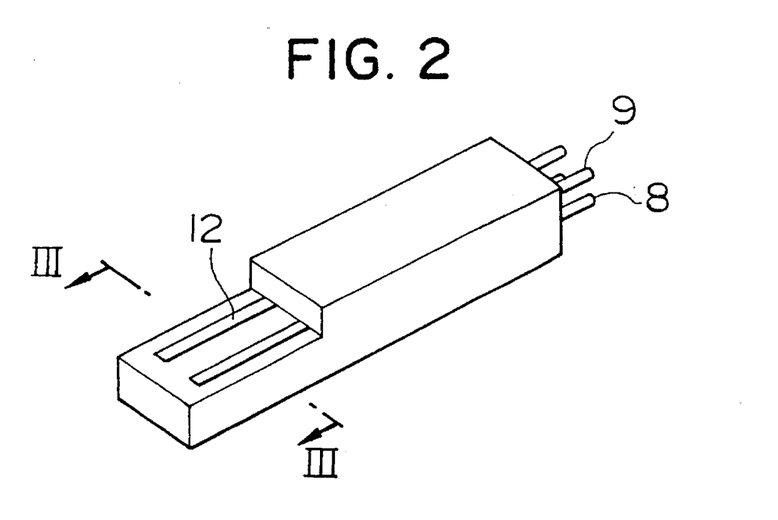
FIG. 2 is a perspective view of the ceramic heater according to the example 1 before a detecting device is mounted.
Figure 3A:
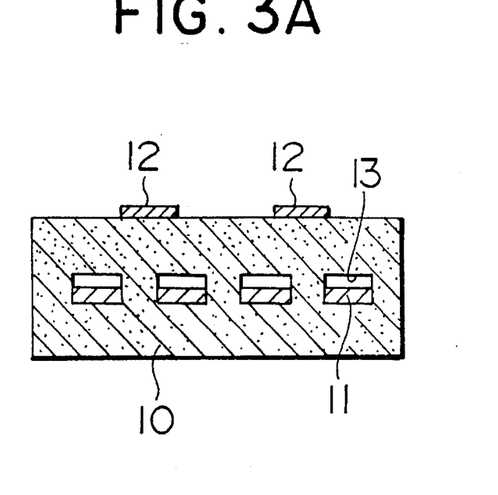
FIG. 3A is a sectional view taken along the line III—III of FIG. 2.
Figure 3B:
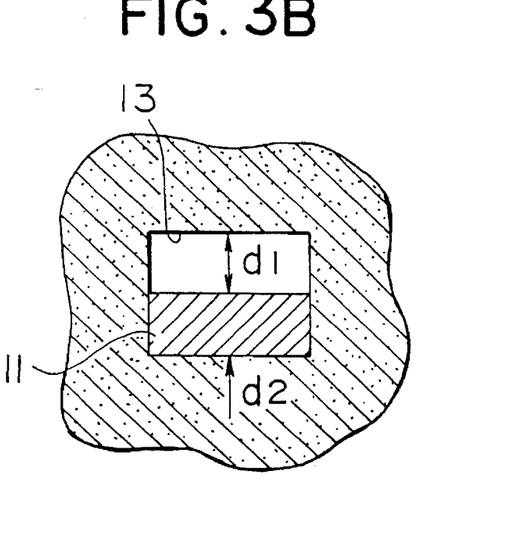
FIG. 3B is an expanded view of FIG. 3A.

As shown in FIG. 3A, the ceramic heater comprises a ceramic sintered body 10 composed of alumina, a Pt heating body 11 embedded in the ceramic sintered body 10, a Pt electrode 12 which is partially exposed from the ceramic sintered body 10 and Pt lead wires 8, 9 (see FIG. 2). The most distinctive feature of the ceramic heater according to the present invention is that a gap 13, which is formed by the contraction of the heating body pattern 6 is provided between the ceramic sintered body 10 and the heating body 11 by making the amount of the contraction due to sintering of the Pt paste used for the heater by sintering larger than that of the alumina sheet to provide a difference in the sintering contraction therebetween. Assuming that the depth of the gap 13 is $d_1$ and the film thickness of the heating body 11 is $d_2$, the ratio between the depth $d_1$ of the gap 13 and the film thickness $(d_1/d_2)$ is 0.5 for example 1.

Figure 4:
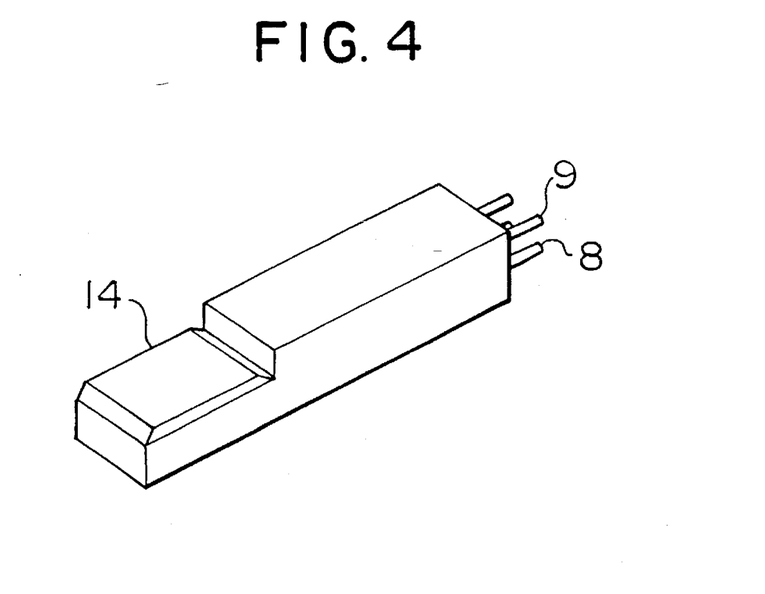
FIG. 4 is a perspective view of the ceramic heater according to the example 1 after the detecting device is mounted.

As shown in FIG. 4, the ceramic heater having the construction described above has a detecting section 14 made of $TiO_2$ which is in contact with the electrode 12, the detecting section serving as an oxygen sensor. By feeding power to the heating body 11 through the lead wire 8, it is possible to heat the detecting section 14 through the ceramic sintered body 10.

At this time, the cations of $Ca^{2+}$, $Mg^{2+}$ and the like in the ceramic sintered body 10 are likely to move due to the difference of electric potentials applied to opposite ends of the heating body 11 under high temperatures provided by heating, causing the cations to move from the +electrode to the −electrode, thereby causing migration at the −electrode of the heating body 11.

However, because the gap 13 is formed in the heating body 11 in the ceramic heater according to the present invention, the cations which are about to move toward the heating body 11 due to migration are seized in the gap 13, impeding their entry into the heating body 11. For this reason, hardly any cations enter the heating body 11 and the gap 13 provides a space in which the volume of the heating body 11 can expand. As described above, in the ceramic heater according to the present invention, the increase of the resistance of the heating body 11 is restricted and at the same time, cracks of the ceramic sintered body 10 due to the expansion of the volume of the heating body 11 are prevented thereby improving the durability.

According to the present ceramic heater, it is not necessary to form a heating body pattern having complicated construction or which has a possible great disparity of production quality, to reduce the amount of the sintering assistant or to increase the film thickness of the heating body 11.

Thus, the ceramic heater according to the present invention can be produced easily without increased production costs and can effectively restrict the change of the resistance in the heating body 11 due to migration. Thus, even if the ceramic heater is used as an oxygen sensor in a vehicle under high temperatures, it is capable of stable measurement and has excellent durability.

Figure 6:
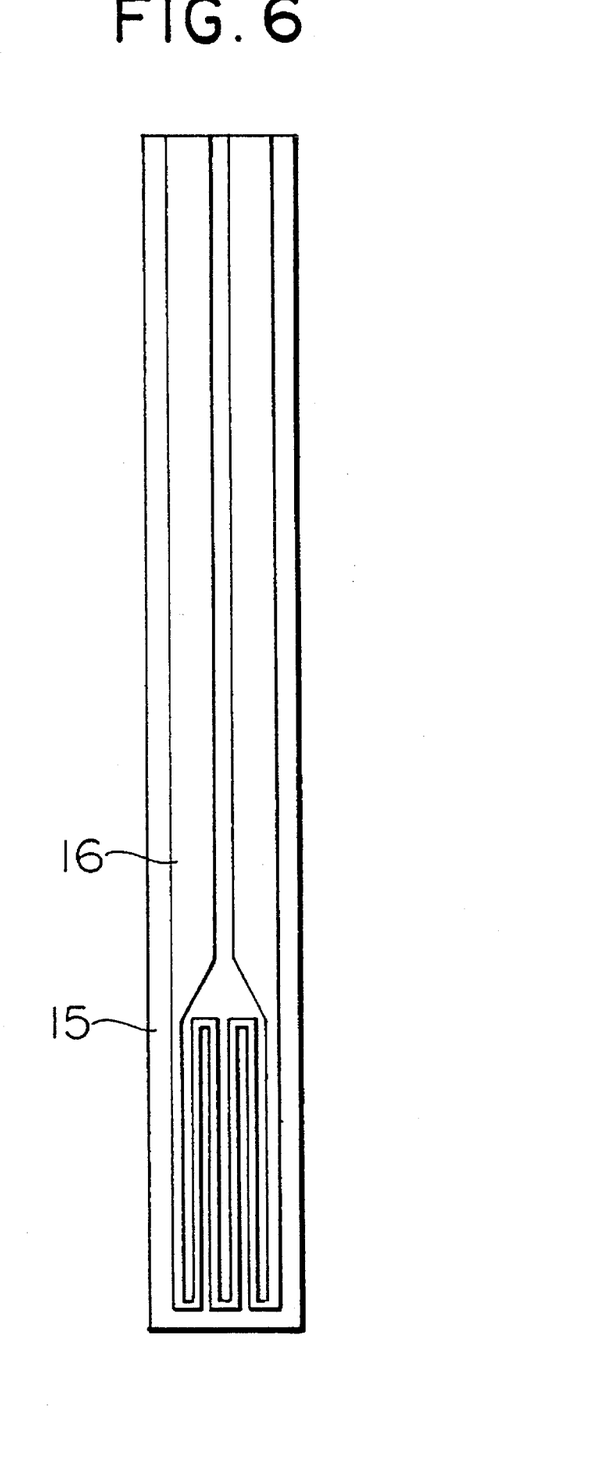
FIG. 6 is a plan view showing the heating body pattern in the ceramic heaters of the examples 2–10.

By changing the amount of organic vehicle contained in the Pt paste to be used for the heating body, a ceramic heater was produced under the condition of $d_1/d_2=0-4.0$. As shown in FIG. 6, a pattern 16 was screen-printed on the alumina green sheet 15 using the Pt paste to be used for the heating body. The other production conditions were the same as that of example 1 and the ceramic heaters of the comparative example and the examples 2–10 were obtained. The resistances of the heating bodies which were made of the Pt paste were determined to be 5.5Ω. The comparative example was the same as the comparative example used in the experiment 1.

The ceramic heaters of the comparative example and the examples 2–10 were subject to vibration tests under conditions in which the vibration acceleration maximum was 35 G and the vibration frequency was 50–2,000 Hz×$10^7$. After the test, it was observed whether the ceramic sintered body was cracked. Also, the ceramic heaters of the comparative example and the examples 2–10 were subject to continuous power feed testing for 1,000° C.×500 hours and the post-testing resistance change rate (%) of the heating body was measured. At the same time, it was observed whether the heating body was cracked. Table 1 shows the result of the test.

TABLE 1

| | | Product Level | | | Result of vibration test | Result of continuous power feed proof test | |
|---|---|---|---|---|---|---|---|
| Sector | | Depth of gap $d_1$ (μm) | Film thickness of heating body (μm) | d1/d2 | Whether a sintered body is cracked | Resistance charge rate of a heating body (%) | Whether or not cracks have occurred |
| Comparative example | | 0 | 20 | 0.0 | No | 44 | Yes |
| Examples | 2 | 2 | 20 | 0.1 | No | 27 | Yes |
| | 3 | 4 | 20 | 0.2 | No | 16 | No |
| | 4 | 7 | 20 | 0.35 | No | 11 | No |
| | 5 | 10 | 20 | 0.5 | No | 7 | No |
| | 6 | 15 | 20 | 0.75 | No | 5 | No |
| | 7 | 20 | 20 | 1.0 | No | 4 | No |
| | 8 | 30 | 20 | 1.5 | No | 3 | No |
| | 9 | 50 | 20 | 2.5 | No | 2 | No |
| | 10 | 80 | 20 | 4.0 | Yes | 1.4 | No |

Experiment 1

As a comparative example, a conventional ceramic heater in which no gap is provided between the ceramic sintered body and the heating body is prepared. The ceramic heater of this comparative example is provided under the same production process as the heater of the example 1 except that $d_1=0$.

Figure 5:
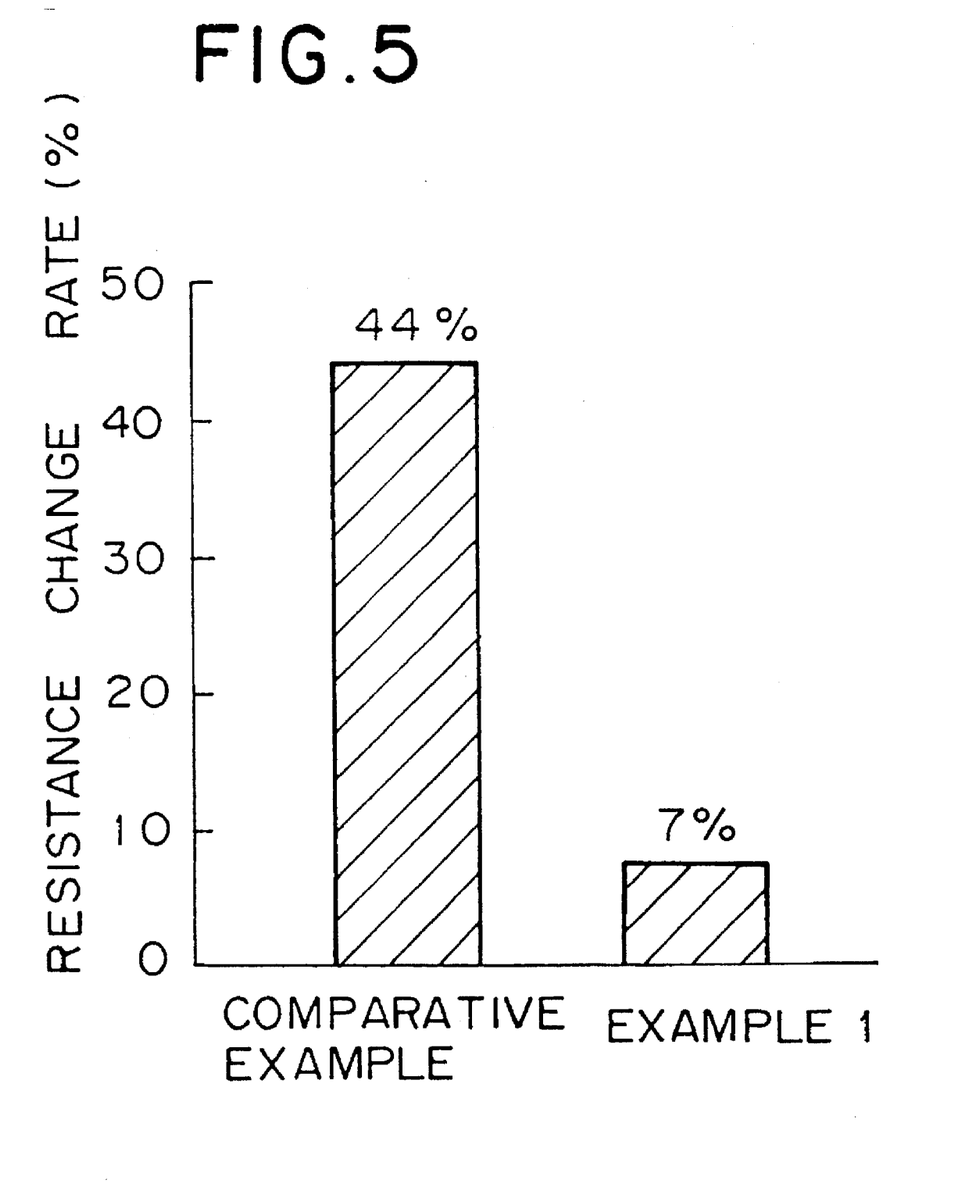
FIG. 5 is a graph for comparing the resistance change rate of the ceramic heater according to the example 1 with that of a comparative example.

Using the ceramic heater of the example 1 and the ceramic heater of the comparative example, continuous power feed proof testing was performed in the following manner. A voltage of 15 V was applied to the ceramic heaters so that the temperature become 1,000° C. and that condition was maintained for 500 hours. Then, a resistance change rate (%) was measured of the heating body after the experiment. FIG. 5 shows the result of the measurement.

Experiment 2

Although, according to the aforementioned example 1, it is thought that the deeper the gap at the −electrode of the heating body, the more effective the gap, and if the depth of the gap is too large, the strength of the ceramic heater may drop. Thus, the effective range of $d_1/d_2$ had to be determined.

From Table 1, it can be seen that if a gap exists, the resistance change rate of the heating body drops so that the advantages of the present invention are obtained. If $d_1/d_2=0.2$ or more, it was recognized that an effect which was sufficient for use in an actual vehicle was obtained. If $d_1/d_2=0.5$ or more, the resistance change rate of the heating body becomes a single digit. This shows that the existence of the gap produces better results.

However, if $d_1/d_2=4.0$ or more, the strength of the ceramic heater drops. Thus, when $d_1/d_2=4.0$ or more, it is necessary to take such measures as enlarging the area in which the heating body is not contact with the ceramic sintered body in order to raise the strength of the ceramic heater. Thus, $d_1/d_2=0.2$ or more is desirable and $d_1/d_2=0.5-2.5$ is preferable.

Figure 7:
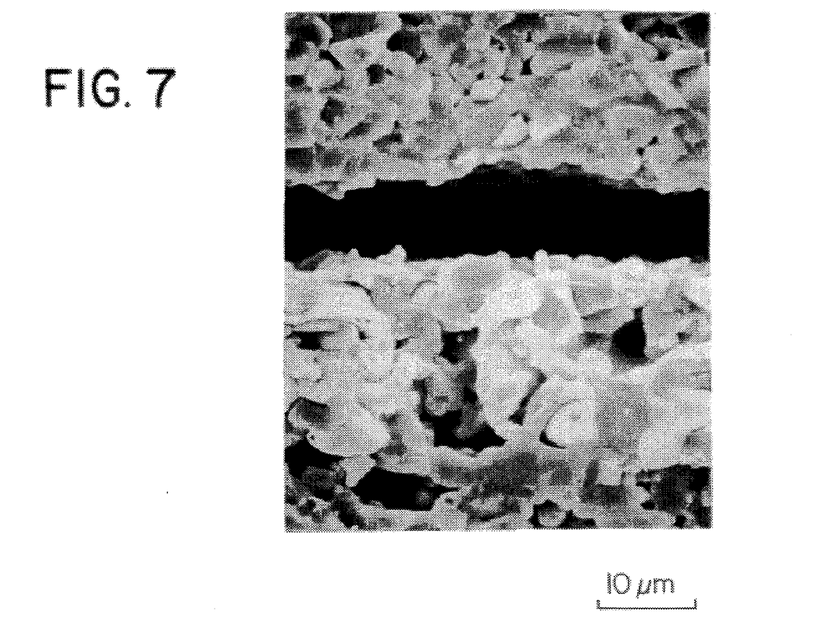
FIG. 7 is an electron microscope photograph of 2,000 magnification showing the particle structure in the ceramic heater according to the example 4 before the continuous power feed proof test is performed.
Figure 8:
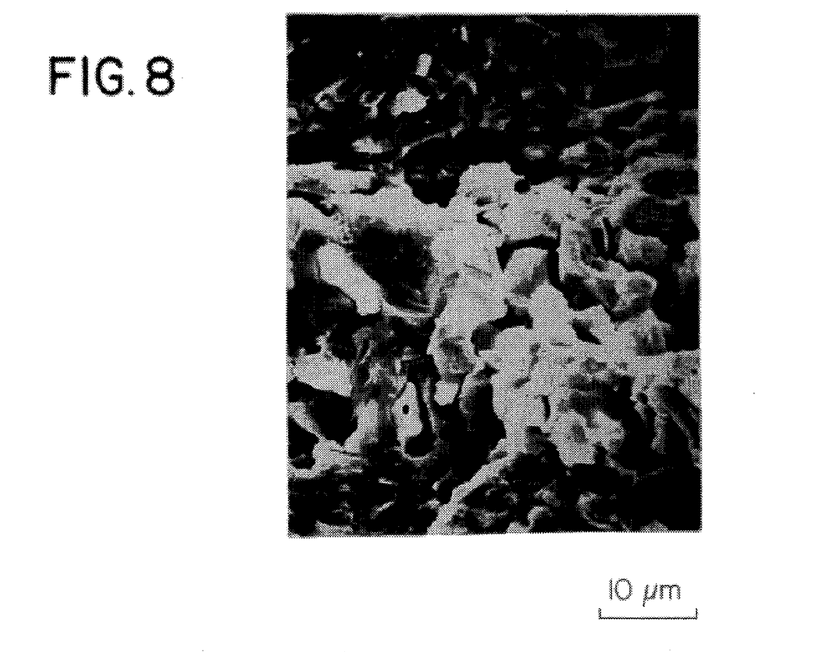
FIG. 8 is an electron microscope photograph of 2,000 magnification showing the particle structure of the electrode in the ceramic heater according to the example 4 after the continuous power feed proof test is performed.
Figure 9:
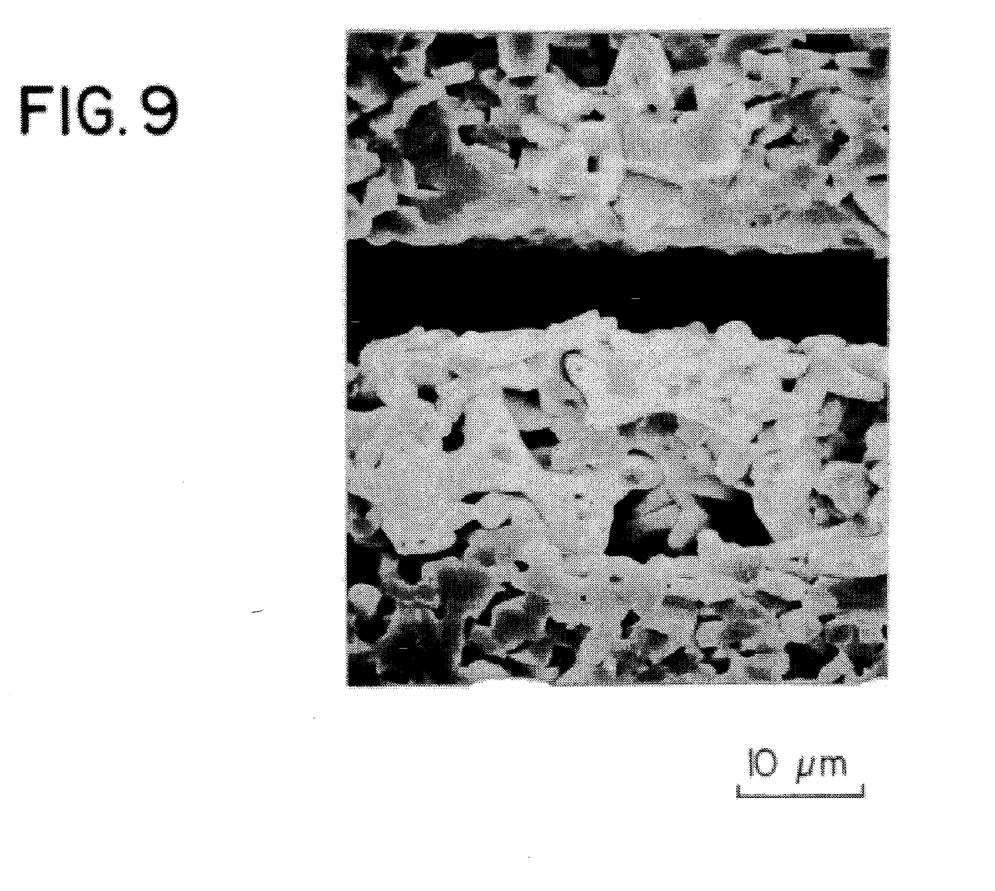
FIG. 9 is an electron microscope photograph of 2,000 magnification showing the particle structure of the +electrode in the ceramic heater according to the example 4 after continuous power feed proof test is performed.

As regards the ceramic heater according to the example 4, FIGS. 7–9 show electron microscopic photographs indicating the structures of the ceramic sintered body, the heating body and the gap. FIG. 7 is a microscopic photograph taken before continuous power feed proof testing, FIG. 8 shows the structure of the −electrode taken after continuous power feed proof testing and FIG. 9 shows the structure of the +electrode taken after continuous power feed proof testing.

FIGS. 7–9 indicate that, in the ceramic heater according to the example 4, the cations which moved by migration are seized in the gap of the —electrode.

OTHER EXAMPLES

Although, in the examples 1–10, gaps having arbitrary depth were formed by changing the amount of organic vehicle, it is permissible to screen-print the same pattern as the heating body pattern on the heating body pattern using only organic vehicle paste and burn the organic vehicle by sintering it to form the same gap as in the examples 1–10.

Further, it is permissible to form an alumina green sheet having indentation of the same pattern as the heating body pattern or form an alumina green sheet having a through hole of the same pattern as the heating body pattern, place such an alumina green sheet on the heating body pattern and sinter them to form a gap.

Figure 10:
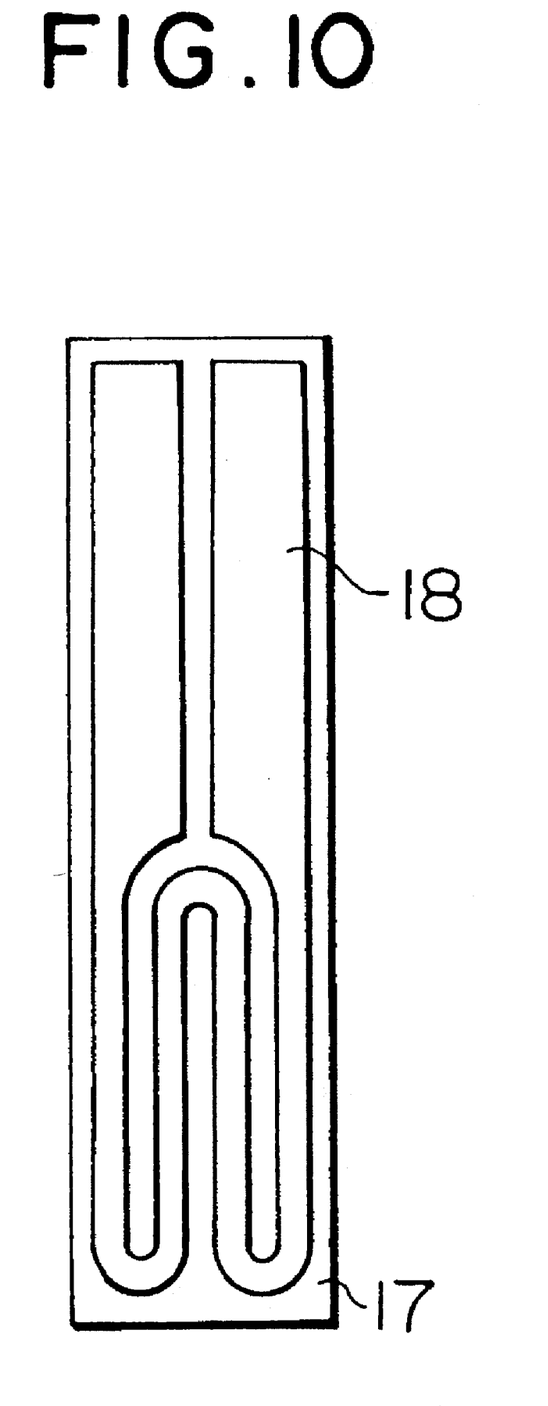
FIG. 10 is a plan view showing the heating body pattern and the like related to the bar-like ceramic heater according to another example.
Figure 11:
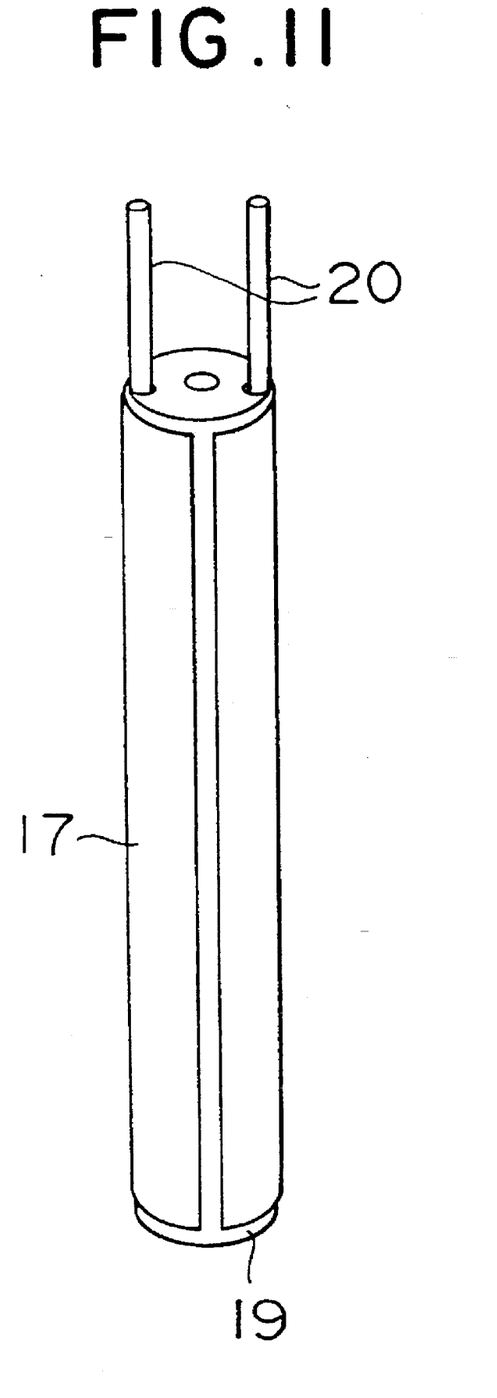
FIG. 11 is a perspective view of the bar-like ceramic heater according to another example.

Still further, the ceramic heater according to the present invention can be embodied not only in the form of a sheet but also of a bar. In this case, a heating body pattern 18 is formed on the alumina green sheet shown in FIG. 10 and as shown in FIG. 11, the alumina green sheet is wound on the alumina green base body 19 together with lead wires 20 made of Pt, thermo-compression bonded and sintered. Also, according to the same process, it is possible to produce a glow plug containing a metallic heating body made of Pt or the like, the heating body being embedded in the ceramic sintered body. Additionally, the ceramic heater according to the present invention can be applied to other sensors, for example, a sensor utilizing a solid electrolyte such as $ZrO_2$.

Although, in the aforementioned examples, the ceramic sintered body made of alumina was used, the present invention is not restricted to alumina and it is possible to use any ceramic sintered bodies having high temperature resistance, high strength and high insulation performance, such as alumina spinel mullite. Although, in the aforementioned examples, a heating body made of Pt was employed, the present invention is not restricted to these examples, but it is permissible to use alloys containing Pt, Rh, tungusten, molybdenum or the alloys of these substances.

In the aforementioned examples, the relationship between the gap 13 and the heating body 11 is shown by the ratio $(d_1/d_2)$ between the depth d1 of the gap 13 and the film thickness $d_2$.

However, the novel gap applied according to the present invention may be constructed in any way if it is provided so that no sintering assistant affects the heating body itself.

Figure 12:
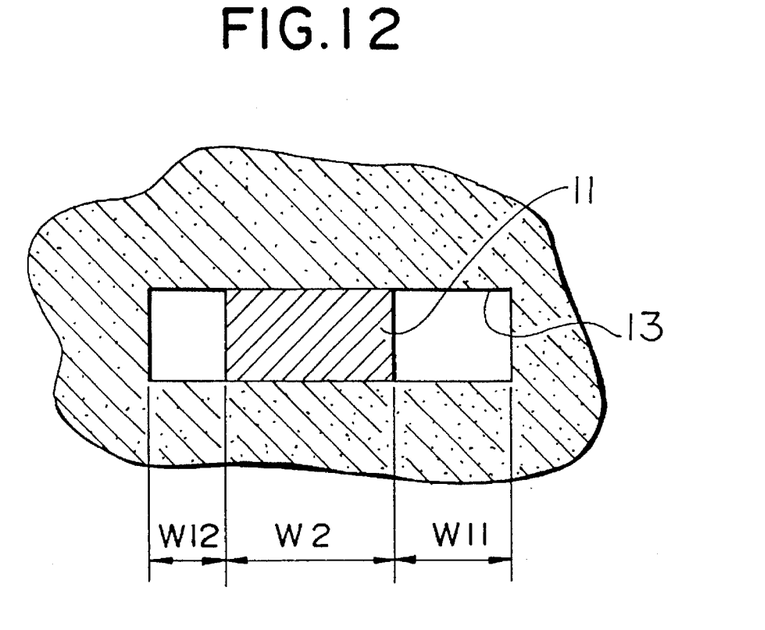
FIG. 12 is a sectional view of still another example.

For example, if, as shown in FIG. 12, the gap is provided not along the depth of the heating body but along the width thereof, a preferable result can be obtained when the ratio $(W_{10}+W_{12})/W_2$ between the width $(W_{11}+W_{12})$ of the gap 13 and the width $W_2$ is more than 0.5 and less than 4. More preferably, when the ratio is 0.5–2.5, it is possible to obtain excellent results in terms of the crack characteristics of the sintered body and the resistance change rate of the heating body.

Figure 13:
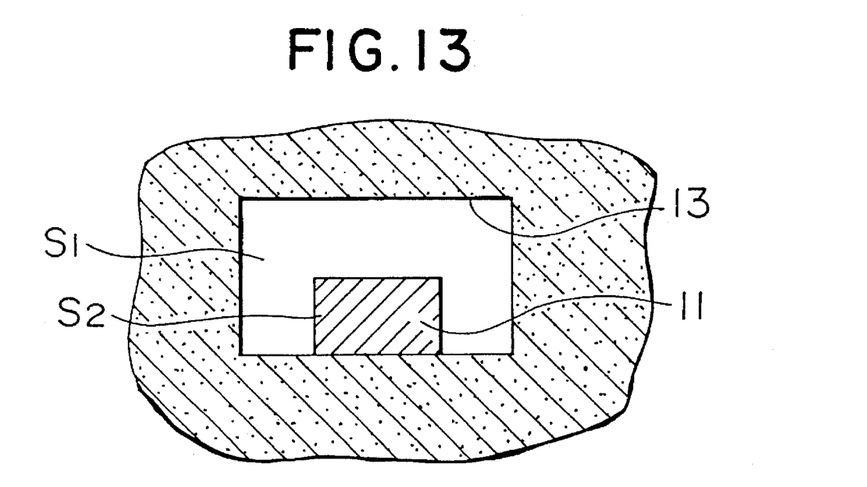
FIG. 13 is a sectional view of further another example.

Still further, if, as shown in FIG. 13, the gap 13 is formed along the width and the depth of the heating body 11, assuming that the sectional area of the gap 13 is S1 and the sectional area of the heating body 11 is S2, a preferable result can be obtained if the ratio (S1/S2) between the sectional area S1 of the gap 13 and the sectional area S2 of the heating body 11 is more than 0.5 and less than 4. More preferably, when the ratio is 0.5–2.5, particularly, it is possible to obtain excellent results in terms of the crack characteristics of the sintered body and the resistance change rate of the heating body.

Although the relationship between the heating body and the gap formed in the ceramic sintered body has been described above, the sectional shapes of the heating body and the gap are not always rectangular. However, the requirements of the present invention are satisfied if the ratio between the values converted to rectangular shape by obtaining the average of the dimension of the heating body and the gap each, corresponds to the values mentioned above for the present invention. With the values converted in this manner also, it is possible to effectively restrict the resistance change of the heating body by migration.

Because the ceramic heater of the present invention includes a gap which is formed between the ceramic sintered body and the metallic heating body as described above, the ceramic heater can be produced easily without increased production costs and effectively can restrict the change of the resistance in the heating body due to migration.

For this reason, if the ceramic heater of the present invention is equipped with a detecting device made of $TiO_2$ or the like and used in various sensors of vehicles or the like, the ceramic heater is capable of stable measurement with excellent durability even if it is used under high temperatures.

What is claimed is:

1. A ceramic heater comprising:

a ceramic sintered body to which a flux for accelerating the sintering of the ceramic has been added; and a metallic heating body, embedded in and contacting said ceramic sintered body, for heating said ceramic sintered body when electric current is supplied thereto;

and the ceramic heater including a gap for collecting said flux of said ceramic sintered body when electric current is supplied to said metallic heating body, the gap being between said ceramic sintered body and said metallic heating body, wherein $d_1/d_2$ is 0.2 or more, $d_1$ being a depth of said gap between said metallic heating body and said ceramic sintering body and $d_2$ being a thickness of said metallic heating body.

2. A ceramic heater according to claim 1 wherein $d_1/d_2$ is more than 0.5 and less than 4.

3. A ceramic heater according to claim 1 wherein $d_1/d_2$ is more than 0.5 and less than 2.5.

4. A ceramic heater comprising:

a ceramic sintered body to which a flux for accelerating the sintering of the ceramic has been added; and a metallic heating body, embedded in and contacting said ceramic sintered body, for heating said ceramic sintered body when electric current is supplied thereto;

and the ceramic heater including a gap for collecting said flux of said ceramic sintered body when electric current is supplied to said metallic heating body, the gap being between said ceramic sintered body and said metallic heating body, wherein $W_1/W_2$ is 0.2 or more, $W_1$ being a width of said gap between said metallic heating body and said ceramic sintered body and $W_2$ being a width of said metallic heating body.

5. A ceramic heater according to claim 4 wherein $W_1/W_2$ is more than 0.5 and less than 4.

6. A ceramic heater according to claim 4 wherein $W_1/W_2$ is more than 0.5 and less than 2.5.

7. A ceramic heater comprising:

a ceramic sintered body to which a flux for accelerating the sintering of the ceramic has been added; and a metallic heating body, embedded in and contacting said ceramic sintered body, for heating said ceramic sintered body when electric current is supplied thereto;

and the ceramic heater including a gap for collecting said flux of said ceramic sintered body when electric current is supplied to said metallic heating body, the gap being between said ceramic sintered body and said metallic heating body, wherein S1/S2 is 0.2 or more, S1 being a sectional area of said gap between said metallic heating body and said ceramic sintering body and S2 being a sectional area of said metallic heating body.

8. A ceramic heater according to claim 7 wherein S1/S2 is 0.5 or more and less than 4.

9. A ceramic heater according to claim 7 wherein S1/S2 is 0.5 or more and less than 2.5.

* * * * *